United States Patent [19]
Doyle et al.

[11] Patent Number: 6,095,713
[45] Date of Patent: Aug. 1, 2000

[54] ENGAGEMENT DEVICE AND COUPLING MEMBER

[75] Inventors: David Doyle, Neutral Bay; Neil Dunne, Cammeray; Mark Cumming, Niagara Park, all of Australia

[73] Assignee: D & D Group Pty Ltd, New South Wales, Australia

[21] Appl. No.: 08/360,745

[22] PCT Filed: Jun. 24, 1993

[86] PCT No.: PCT/AU93/00308

§ 371 Date: Dec. 23, 1994

§ 102(e) Date: Dec. 23, 1994

[87] PCT Pub. No.: WO94/00699

PCT Pub. Date: Jan. 6, 1994

[30] Foreign Application Priority Data

Jun. 24, 1992 [AU] Australia .............................. PL 3128

[51] Int. Cl.[7] .................................................. F16B 7/04
[52] U.S. Cl. .......................... 403/97; 403/103; 403/170; 403/205; 403/370; 403/371
[58] Field of Search .................................. 403/367, 368, 403/370, 371, 373, 374, 365, 297, 292, 314, 103, 110, 84, 217, 169–171, 205, 403, 388, 394, 218, 219, 176, 178, 97

[56] References Cited

U.S. PATENT DOCUMENTS

| | | | |
|---|---|---|---|
| 618,639 | 1/1899 | Bullard | 403/370 |
| 1,818,172 | 8/1931 | Sutherland | 403/205 |
| 2,151,831 | 3/1939 | Buccione | 403/370 |
| 2,583,368 | 1/1952 | French | 403/178 |
| 2,839,320 | 6/1958 | Hill . | |
| 2,911,243 | 11/1959 | Micozzi . | |
| 3,213,273 | 10/1965 | Zagel | 403/103 X |
| 3,361,460 | 1/1968 | Jansen | 403/370 X |
| 3,495,857 | 2/1970 | Hawke et al. | 403/97 X |
| 3,545,796 | 12/1970 | Nicholls . | |

FOREIGN PATENT DOCUMENTS

| | | | |
|---|---|---|---|
| 111297 | 12/1939 | Australia . | |
| 236396 | 10/1959 | Australia . | |
| 13830/6Z | 8/1963 | Australia . | |
| 477707 | 4/1992 | European Pat. Off. | 403/370 |
| 1189024 | 3/1959 | France | 403/171 |
| 1278327 | 10/1961 | France | 403/297 |
| 202929 | 10/1983 | Germany | 403/170 |
| 3444608 | 6/1986 | Germany | 403/370 |
| 1477465 | 6/1977 | United Kingdom | 403/297 |

*Primary Examiner*—Harry C. Kim
*Attorney, Agent, or Firm*—Davis and Bujold

[57] ABSTRACT

The present invention relates to engagemnent devices and coupling members for forming a structural frame work for hollow tubes. One form of engagement device comprises a hollow sleeve (1) through which a tube (31) may be passed. The hollow sleeve has a deformable flared portion (2). A further hollow sleeve member (12) is immovable on the outside of the first sleeve and has a surface (13) arranged to co-operate the flared portion to cause it to deform to grip the tube (31). A further engagement device comprises a hollow sleeve portion (100) which is distendable to grip a tube mounted on its surface. A trustoconical wedge (101) is movable within the hollow sleeve potion (100) to cause to distend. A number of engagement devices may be connected together to form coupling members for connecting tubes to form a structural frame work.

15 Claims, 14 Drawing Sheets

ENGAGEMENT DEVICE AND COUPLING MEMBER

The present invention relates particularly, but not exclusively, to constructions which are typically formed by connecting tubes together to form a structural frame work.

BACKGROUND OF THE INVENTION

Various types of couplings are disclosed for connecting tubes together but each of them suffer from at least one major drawback.

A typical way of coupling tubes together, is to use a bracket which is preformed in two halves so that when the halves are combined they define two holes which are arranged to receive different tubes. Using nuts and bolts, the brackets are tightened together so as to grip each of the tubes and thus, hold the tubes in a fixed orientation with respect to each other.

The problem with such a bracket is that it is necessary to hold the tubes in a fixed orientation before the two halves of the bracket are combined and in addition, there is little flexibility as to changing the orientation of each tube with respect to the other. This is because the brackets must be preformed so that when connected to tubes they can only hold the tubes in one particular orientation with respect to each other.

Other devices for connecting tubes together require the tubes to be specially shaped so that they have flattened ends in the form of lugs which can be inserted onto the end of a coupling device. A combination of brackets and nuts and bolts are then used to assemble the tubes into a desired structure.

Another form of a coupling device is in the form of a joint with preformed sockets arranged around a centre, thus, permitting tubes to be connected in one of the orientations provided by one of the sockets. As with the previous coupling devices however, there is little flexibility in the number of positions in which the tubes can be fixed.

SUMMARY OF THE INVENTION

According to the present invention there is provided a coupling member for coupling a plurality of beams together, including a first engagement device including a sleeve having a passage therethrough for receiving a beam, the sleeve having a portion which is deformable to grip the beam, a tightening member having a passage therethrough for receiving the sleeve and being axially movable with respect to the sleeve and being arranged to co-operate with the deformable portion to cause the deformable portion to deform to grip the beam, and a biasing means for maintaining the tightening member in co-operation with the deformable portion, the coupling member further including a second engagement device mounted to the first engagement device, the second engagement device being arranged to engage and hold a further beam in a predetermined orientation with respect to the first beam.

The term "beam" is intended to cover hollow tubes and solid bars of any cross-section.

The deformable portion preferably comprises an external flared portion of the sleeve. The tightening member has a cooperating flared surface which is movable over the flared portion of the sleeve to cause deformation.

The sleeve preferably comprises a tubular body portion having a maximum inside diameter slightly greater than the maximum inside diameter of a beam to be gripped, and a flexible flared portion arranged such that when the co-operating flared surface of the tightening member is moved over the flared portion towards the distal end of the flare, the inner surface of the sleeve in the area of the flared portion is constricted to grip the beam. Deformable portion is preferably provided with a plurality of slits dividing it into a plurality of segments to facilitate deformation.

The internal surface of the deformable portion may be provided with frictional engagement means, such as a rubber surface, or serrated surface, for example, to assist in gripping the beam.

The biasing means preferably comprises a threaded portion at the sleeve and a retainer, preferably in the form of a threaded nut, cooperating with the threaded portion to axially move the tightening member with respect to the flared portion of the sleeve to cause deformation thereof and gripping of the beam.

Preferably, the tightening member comprises a further tubular sleeve having an inner diameter large enough to receive the sleeve and being movable axially over the outer surface of the sleeve and having an internal flared surface on at least a portion of the inside surface of the tightening member to cooperate with the flared portion of the sleeve.

In its undeformed state, the maximum inside diameter of the flared sleeve portion (deformable portion) may be greater than the maximum inside diameter of the tubular body portion. Preferably, the flared sleeve portion is at one end of the tubular body portion of the sleeve.

In one embodiment, the second engagement device includes a hollow sleeve which is arranged to distend outwardly so the external surface of the hollow portion may abut and grip on the internal surface of a hollow beam to be gripped. A wedge movable within the hollow portion of the sleeve causes it to distend outwardly.

The outwardly distendable hollow portion is preferably tubular and arranged to grip the inside of a hollow tube. Slits are preferably provided in the hollow portion to facilitate deformation.

The wedge is preferably frustoconical in shape and the hollow sleeve portion may be flared to conform with the frustoconical shape of the wedge.

A biasing means for the second engagement device preferably comprises a hollow threaded portion which runs within the wedge and which is arranged to cooperate with a screw the head of which is mounted in a body portion connected to the hollow sleeve. Rotation of the screw will cause movement of the wedge within the hollow sleeve portion.

Projection means may be provided on the external surface of the wedge to engage with the internal surface of the hollow sleeve and prevent rotation of the wedge within the sleeve.

As will become apparent from the following description of preferred embodiments, a plurality of engagement devices, may be connected together in any desired relative attitude to form coupling members for coupling a plurality of beams together, whereby to enable construction of a frame-work. Components of the engagement devices may be integrally molded together in a predetermined relative attitude, for example. A body portion of one type engagement device may form a tightening member for another engagement device, for example.

In a preferred embodiment of the coupling member, two of the engagement devices of the type having a distendable hollow sleeve portion are connected with an engagement device type having a constrictable flared portion. A body portion of the engagement device of the type having a distendable hollow sleeve is arranged to form the tightening member for the engagement device having a constrictable flared portion. This engagement device comprises a tubular body portion over which the tightening member, is arranged to move to cause constriction of the flared portion. The tightening member is also rotatable so that the position of the engagement device with the hollow distendable sleeve can be altered. A further engagement device of the type having a hollow distendable sleeve also has a body portion arranged to move axially on the tubular body portion of the constrictable flared sleeve type engagement device. This body portion is also rotatable so that the position of the further engagement device can be altered. The respective body portions of the engagement devices having hollow distendable sleeves are preferably provided with respective engagement means to enable them to be locked together to fix the relative positions of the engagement devices. The engagement means is preferably interlockable teeth.

Other types of coupling member include two or more engagement devices of the form having a flared sleeve for gripping a beam passing through the flared sleeve, the engagement devices being connected with respective axes at predetermined angles to each other to enable beams to be connected together running in desired different angles.

Other combinations of coupling elements are also available, as will become clear from the following description of preferred embodiments of the invention.

With regard to the tubular engagement devices having constrictable flared sleeves, the biasing means, preferably in the form of a rotatable nut, preferably has engagement means in its external surface to enable it to be gripped by a spanner having co-operating engagement means to facilitate tightening of the engagement device.

The spanner is preferably a "C" spanner having a "C" shaped operating end for gripping the tightening member.

In the engagement device, the sleeve need not be a complete cross-section, but could be a three-quarter or other type of cross-section, i.e. only part of a tube.

It is an advantage of at least preferred embodiments of the invention, to enable simple and easy construction of structural frame works, for example for greenhouses, buildings etc. Axial motion of the tightening member with respect to the sleeve, enables a beam or tube to be rapidly engaged or disengaged by the engagement device.

BRIEF DESCRIPTION OF THE DRAWING(S)

Features and advantages of the present invention will become apparent from the following description of embodiments thereof, by way of example only, with reference to the accompanying drawings, in which.

DESCRIPTION OF THE PREFERRED EMBODIMENT(S)

Figure 1A:
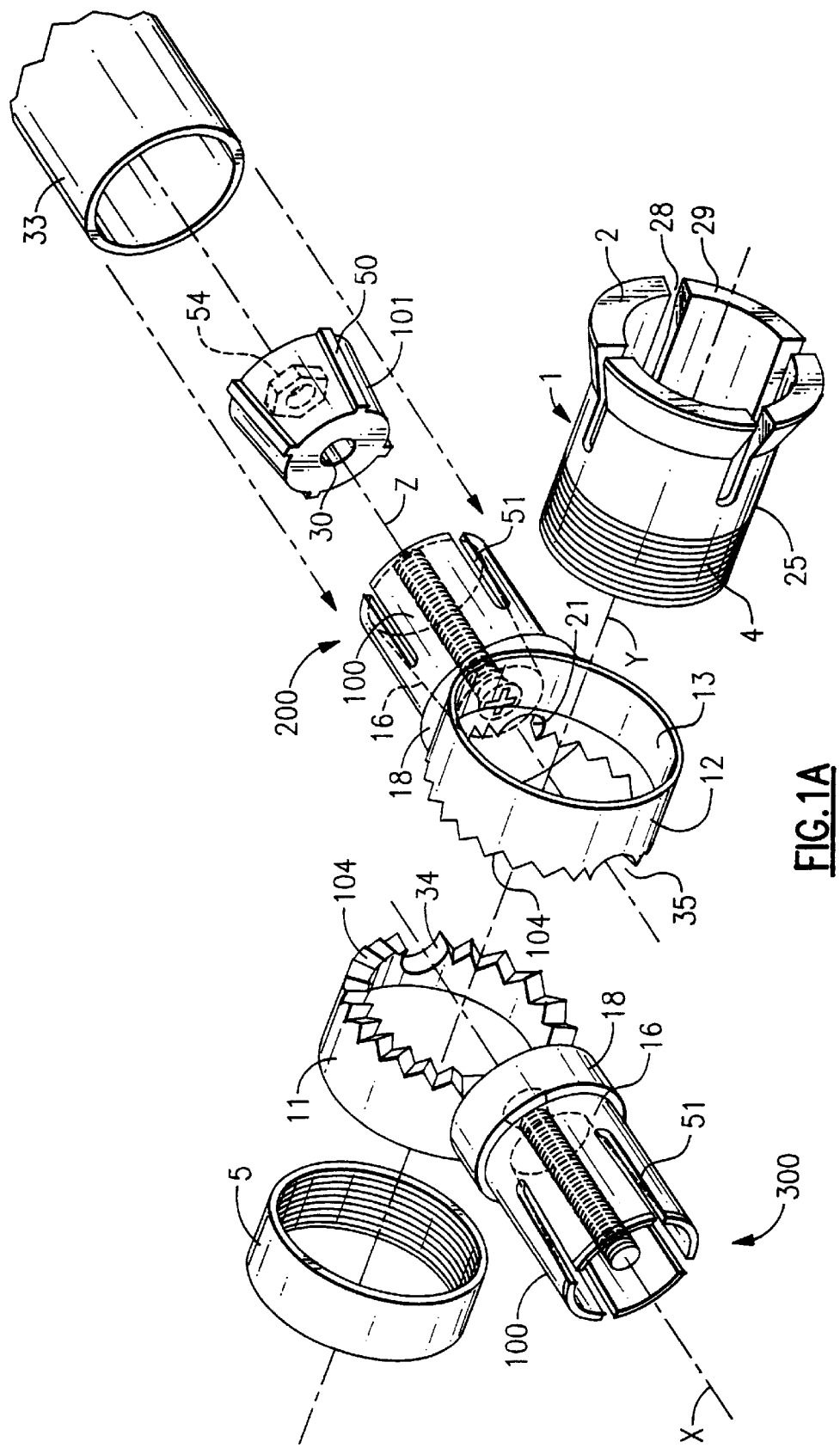
FIG. 1A shows an exploded perspective view from above and one side of a coupling member in accordance with an embodiment of the present invention.

Firstly, with reference to FIGS. 1 through 4 a coupling member will be described which incorporates in combination engagement devices of two different embodiments of the present invention.

A first engagement device comprises a sleeve 1 having a deformable portion 2 in the form of a flared portion of the sleeve 1. A tightening member 12 is movable axially over the sleeve 1 and is provided with a cooperating flared surface 13 movable over the flared portion 2 to cause the inside surface 3 of the flared portion to grip a beam (FIG. 1B) passing through the sleeve 1. A biasing means comprising threaded portion 4 of the sleeve 1 and a cooperating retainer nut 5 are operable to bias the tightening member 12 towards the flared portion 2 of the sleeve 1.

The coupling member also comprises two other engagement devices of the present invention. A second engagement device 200 comprises a hollow sleeve portion 100 and a cooperating wedge portion 101, the wedge portion 101 is frustoconical in shape and fits within the hollow sleeve portion 100. A biasing means in the form of a thread portion 30 in the wedge and cooperating screw 53 allows adjustment of the position of the wedge 101 within the hollow sleeve 100. As the wedge 101 moves into the hollow sleeve 100 the hollow sleeve 100 distends outwardly to grip a hollow tube 33 seated on the outer surface of the hollow sleeve portion 100. The second engagement device is coupled to the first engagement device by means of tightening member 12 which is integral with the second engagement device 200. This enables two tubes 31, 33 to be connected together with different axial orientations. In the specific embodiment illustrated, the tubes are connected together with their axes perpendicular to each other.

A third engagement device 300 is also provided in the coupling member of FIG. 1A to enable a further tube to be connected. The third engagement device is the same in all respects as the second engagement device and similar reference numerals are used. A further sleeve portion 11 which is integral with the third engagement device, is of the same structure as the tightening member 12, internal with the second engagement device but is placed on the sleeve 1 in reverse attitude to the placement of tightening member 12. The relative angles between the hollow sleeve portions 100 of the second and third engagement devices can be adjusted. Teeth 104 are provided on the further sleeve portion 11 tightening member 12. When threaded nut 5 is tightened teeth 104 of further sleeve portion 11 and tightening member 12 interlock to fix a predetermined angle between hollow body portions 100 of respective second and third engagement devices.

If it is desired to adjust the angle between the second and third engagement devices, it is merely necessary to loosen the tightening nut 5, disengage the teeth 104 and rotate the second and third engagement devices relative to each other, before engaging teeth 104 and retightening nut 5 to again lock the coupling member.

In more detail, the second 200 and third 300 engagement devices each consist of a tubular body 16, as shown in FIG. 1A having a hollow sleeve portion 100, with four slits 51 equally spaced around the periphery of the hollow sleeve portion 100 and extending parallel to the central axis of the tubular body 16. These slits 51 extend from the distal end approximately halfway along the tubular body 16 and adjacent a collar 18 which extends to the right most end of the tubular body 16.

The collar 18 has a central recess 21 to allow a screw 53 to be received therein effectively along the central axis of the tubular body 16.

In addition, the collar 18 is provided with the further sleeve portion 11 or tightening member 12 having a longitudinal central axis y aligned perpendicular to the axis x of the tubular body 16. The further sleeve portion 11 and tightening member 12 This tubular head (11,12) is in the form of a ring are in the form of rings, respectively offset to one side of the axis x. In the embodiment shown in FIG. 1A, the further sleeve portion 11 and tightening member 12 are connected to respective collars 18 and thus each (11, 12) require a recess 21 to enable the screw 53 to be inserted into the tubular body 16. It is important to note that the orientation of the further sleeve 11 or tightening member 12 with respect to the collar is not limited to that shown in the drawings. Any orientation is permissible as long as sleeve 1 can fit through the further sleeve 11 and tightening member 12.

The further sleeve 11, is also provided with teeth 104 around the periphery of one side. These teeth are arranged to engage matching teeth 104 on tightening member 12 of second engagement device.

The sleeve 1 which is arranged to be inserted through further sleeve 11 and tightening member 12 of the second and third engagement devices, comprises a tubular body portion 25 which is provided with a peripheral thread 4. The thread 4 extends from the left most end of the sleeve 1 approximately ⅔ of the way along the length of the sleeve 1 to a region adjacent the flared portion 2. The flared portion 2 has a taper of 10–12° outwardly from the tubular body portion 25 and is provided with four slits 28 which effectively divide the plared portion 2 into four equally sized segments 29. Each slit terminates at a region close to the thread 4.

The wedge portion 101 of the second and third engagement devices comprises a frustoconical element having a taper of 5° inwardly. A small bore 30 is also provided concentric with the central longitudinal axis of the element 101.

The wedge portions 101 are provided with four ribs 50 equally spaced around the periphery and extending from end to end of the wedge portions. In operation ribs 50 are aligned with the grooves 51 in the hollow sleeve portion 100.

In operation, the wedge portions 101 is drawn into the sleeve portion 100 by the tightening screw 53. A threaded nut 54 at the end of the wedge portions 101 is housed in a recess and is prevented from rotation as the screw 53 is rotated. Consequently, the wedge portions is drawn into the sleeve 100 and is prevented from relative rotation therewith due to the ribs 50 fitting into grooves 51. Beam 55 which is placed over the combined wedge portions hollow sleeve portion is then fixed by virtue of the grip on it provided by external surface of the sleeve 101.

A spring (not shown) may be provided mounted around the screw thread 53 to bias the head of the screw 53 into the recess 21 of the second and third engagement members. The spring would abut the further sleeve 11 and member 12 and one end of the wedge portion 101 and prevent the head of the screw 53 from interfering with positioning of sleeve 1 of the first engagement device. Other means than the ribs 50 may also be provided on the frustoconical wedge 101 to prevent rotation in hollow sleeve 100.

A description will now be provided of the manner in which the coupling member is assembled.

Figure 1B:
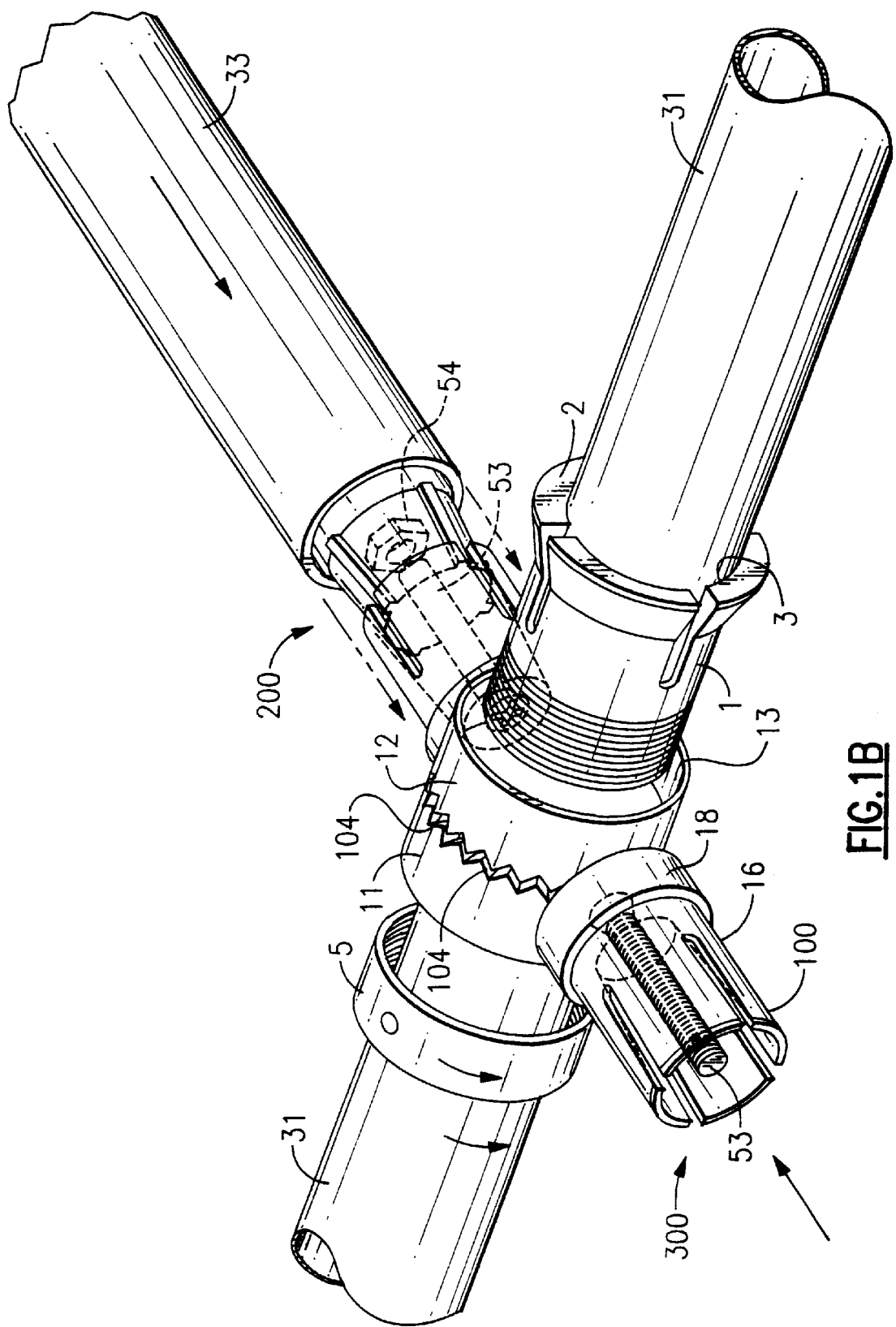
FIG. 1B shows the coupling member of FIG. 1A with tubes 31, 33 positioned in relation to the coupling components just before they are assembled together.

Further sleeve portion 11 and tightening member 12 of second and third engagement devices are brought together as shown in FIG. 1B so that their teeth 104 are in engagement. As shown in FIG. 2, the axis x of the second engagement device is offset by α° from the axis z of the third engagement device. The sleeve 1 is then inserted through the further sleeve portion 11 and tightening member 12 until the right most end of tightening member 12 abuts the flared portion 2. At this point, the left most part of sleeve 1 protrudes beyond the left most end of further sleeve portion 11 and enables the retaining nut 5 to be screwed onto the sleeve 1. A cylindrical tube 31 (FIG. 1C) is then inserted through the sleeve 1 and, as seen in FIG. 2, has an external diameter which is slightly smaller than the internal diameter of the tubular body portion 25 of the sleeve 1.

By turning the retaining element 5, the flared portion 2 is drawn into the head 12. As a result, the internal diameter of the flared portion begins to decrease causing it to grip the tube 31. The further the flared portion 2 is drawn within the head 12, the more the internal diameter of the flared portion decreases and the grip tightens on the bar 31.

A point is eventually reached whereby the flared portion 2 tightly grips the bar 31 so that frictional engagement between the inner surface of the flared portion 2 and the external periphery of the bar 31 prevents relative displacement therebetween. Additional frictional engagement means may be provided on the inner surface of the flared portion 2 to assist in maintaining a grip on tube 31. For example, such engagement means may comprise a rubber gasket on the inner surface of the flared portion, serrations, spikes, or any other convenient means.

In addition to the tube 31 being fixed in position, the second and third engagement members are also fixed together so that there is no relative displacement possible between the x and z axes.

Additional tubes are fixed to the tubular body 16 of the second and third engagement members. This is done before all the coupling member components are fixed together.

This is done by placing a hollow tube over the end of each of tubular bodies 16 so that they abut with the collar 18.

Figure 2:
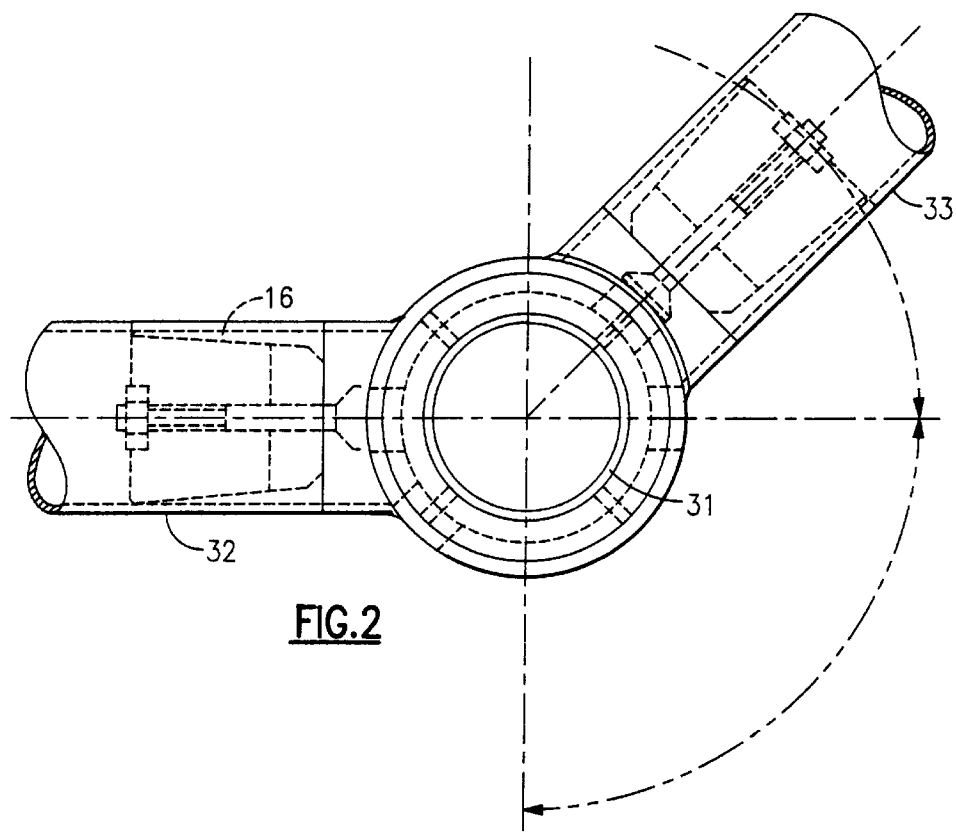
FIG. 2 is an end-on view of the assembled coupling member of FIG. 1, showing some internal features in ghost outline.
Figure 3:
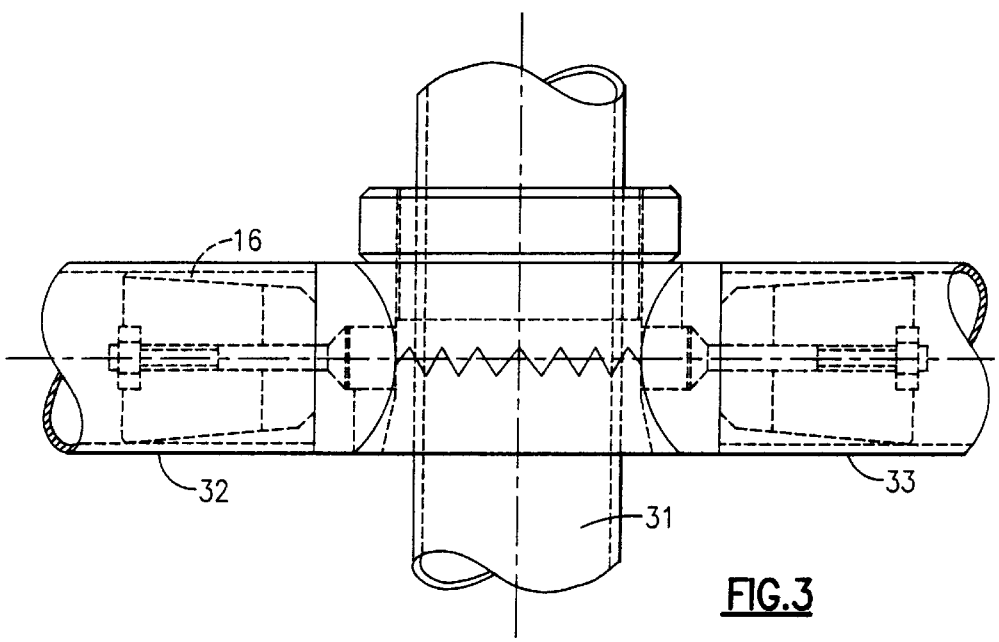
FIG. 3 is a top view of the assembled coupling of FIG. 1A showing some features in ghost outline.
Figure 4:
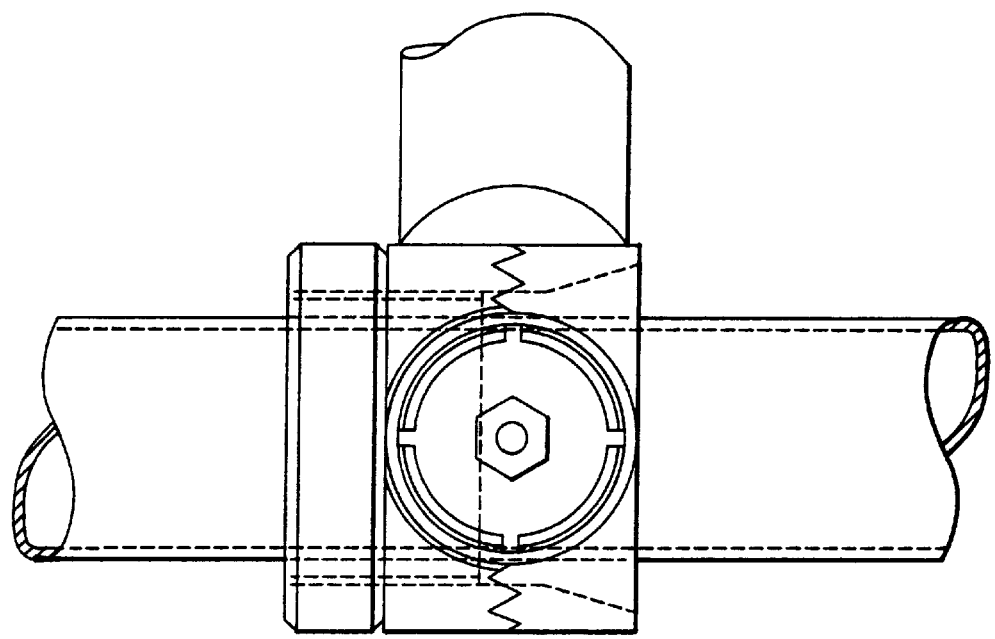
FIG. 4 is a side-on view of the assembled coupling of FIG. 1A showing some features in ghost outline.

The wedge portion 101 is held partly within the sleeve of tubular body 16 by the screw 53 which is inserted part way into the end of the bore 30 of the wedge portion 101. As shown in FIG. 2 and FIG. 3, a tube 32 is received on the sleeve of tubular body 16. By turning the screw 53 in one direction of rotation, the wedge portion 101 is drawn into the sleeve of tubular body 16. It follows therefore, that because of the external shape of the wedge portion, which has a maximum external diameter which is greater than the internal diameter of the tubular body 16, the sleeve elements of the tubular body 16 are forced to distend and eventually frictionally engage the inside peripheral surface of the tube 32.

The further the wedge portion 101 is drawn into the sleeve 100, the more the sleeve is forced outwardly to exert greater pressure on the internal peripheral surface of the tube 32.

Figure 1C:
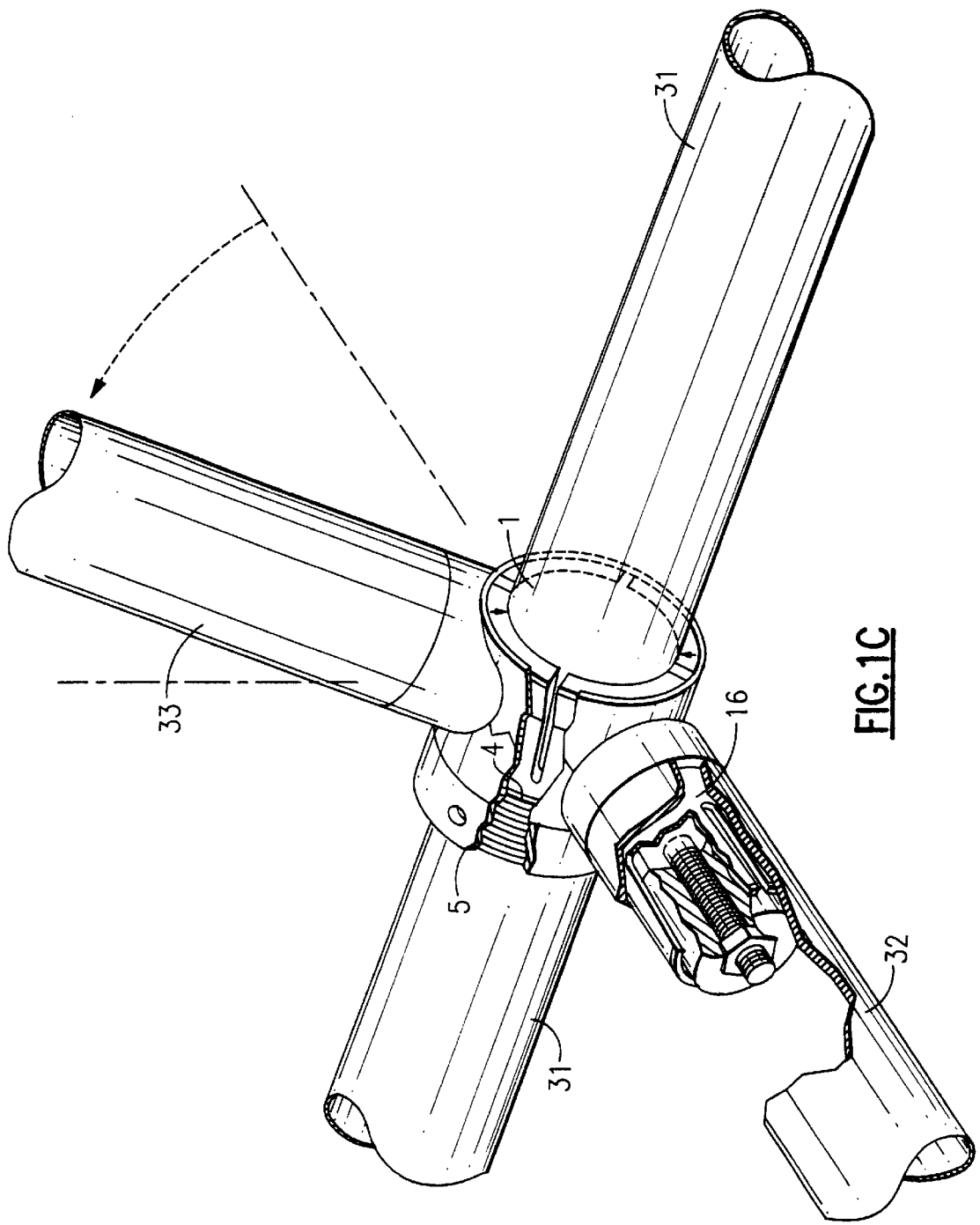
FIG. 1C shows a partial cut away view of the coupling member of FIG. 1A in assembled form.
Figure 1D:
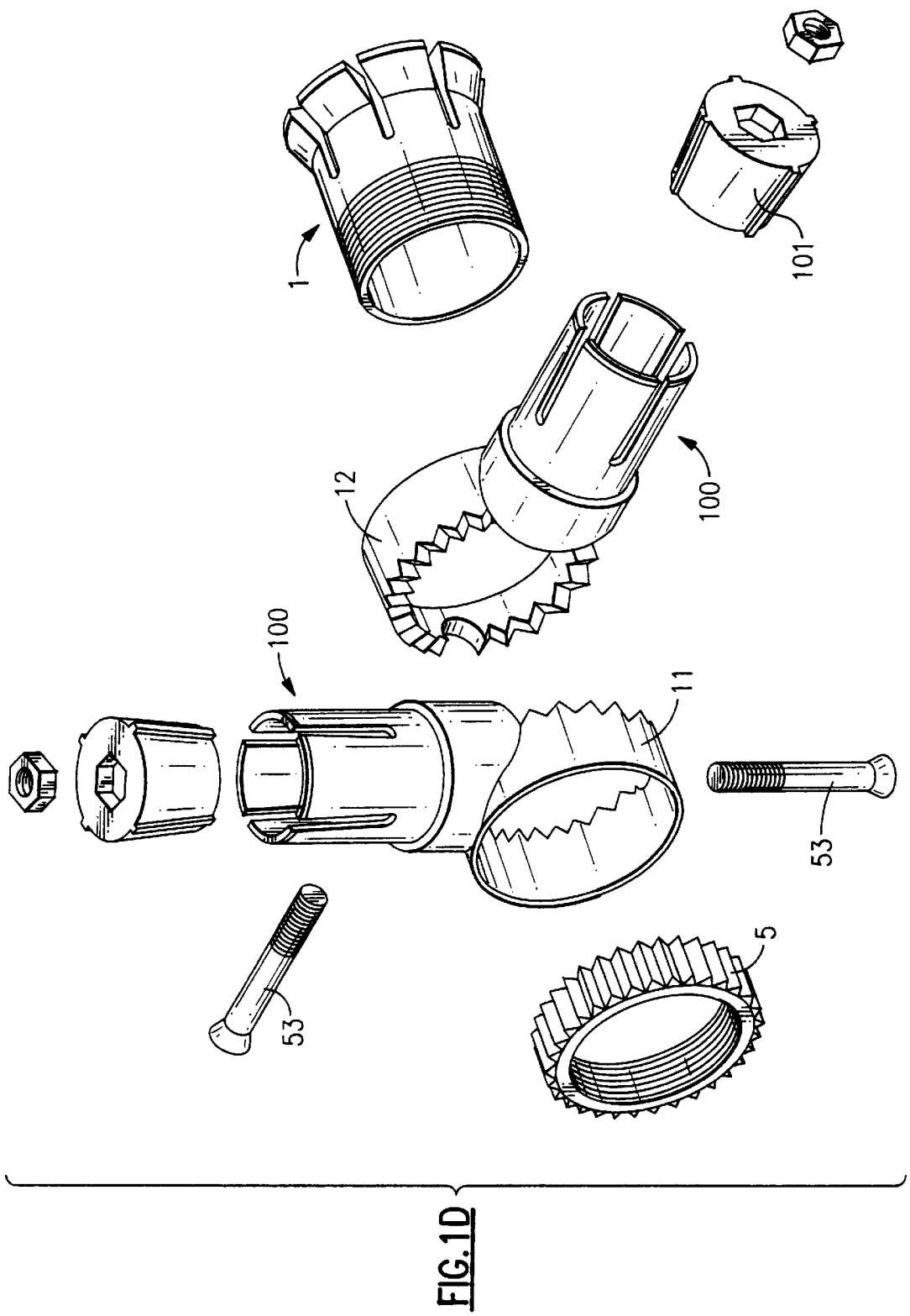
FIG. 1D is a further exploded perspective view of the coupling member of FIG. 1A.

A point is eventually reached as shown in FIG. 1C whereby the tube 32 is prevented from any relative axial movement with respect to the tubular body 16 and at this point, coupling is then completed.

Further engagement means may also be provided on the outer surface of the sleeve 101 to assist in gripping the internal surface of tubular bar 32, 33.

If it is desired to change the angle of the x axis with respect to the z axis, i.e., change the orientation of bar 32 with respect to bar 33 the retaining nut 5 can simply be disengaged from the tubular body 25 so that the teeth 104 can be disengaged and the orientation of tightening member 12 with respect to further sleeve portion 11 can be changed. Nut 5 then can be tightened again to fix the engagement devices in their new orientation.

According to one embodiment of the present invention, when the coupling components are disassembled for reorientation of the x and y axes, normally only a slight turning of nut 5 to release the flared portion 2 from abutment with tightening member 12 will allow such disengagement between these two parts.

In the embodiment described above, wedge portion 101 has been disclosed as having a maximum external diameter which is greater than the internal diameter of the sleeve 100. It is equally possible for the sleeve 100 to be provided with a tapered internal surface, i.e., a bore of reducing internal diameter from its left most end towards the collar end.

It is also envisaged that any number of skirt segments could be provided on the sleeves of all types of engagement devices and in addition, some of these segments could be removed so that there are only upper and lower segments or lateral segments. In such a situation, the tube need not be inserted fully through the tubular component 25 but instead could be aligned transversely to the tubular component 25 so that the skirt segments 29 are in the form of clamps which grasp the lateral bar. The body 25 in such a situation would not need to be tubular but could be a solid body.

In the preferred embodiment described above, it should also be noted that as each of the further sleeve 11 and tightening member 12 are offset with respect to the respective axes x and z. When the further sleeve 11 and tightening member 12 are connected together so that their teeth are in engagement, the combined length along the y axis is only slightly larger than the diameter of each collar 18. It is also noted that a recess 34 and 35 is respectively provided on the end of each of the further sleeve 11 and tightening member 12 where the teeth are located, in alignment and opposite the recess 21. Thus, the recesses combine to form a circular recess, to receive screw 53.

Using the coupling member as described above, it is possible to construct a structural frame work which consists of beams or bars or any other elongate member which is used in a support structure.

Some applications are in constructing tents, scaffolding, display stands and fencing. Other applications are in toy "building sets".

The coupling member of FIGS. 1 to 3 is only one example of a type of coupling member which can be constructed utilising engagement devices in accordance with embodiments of the present invention. Many different configurations of coupling members are possible.

Further, a single engagement device can be used on its own to grip and hold beam where required. For example, an engagement device could be used as a base on which to mount a beam.

Further, the engagement devices of the present invention may be of any convenient cross-section to grip any cross-section tube or bar. The engagement devices of some embodiments also can grip solid bars and not just hollow tubes.

Figure 5:
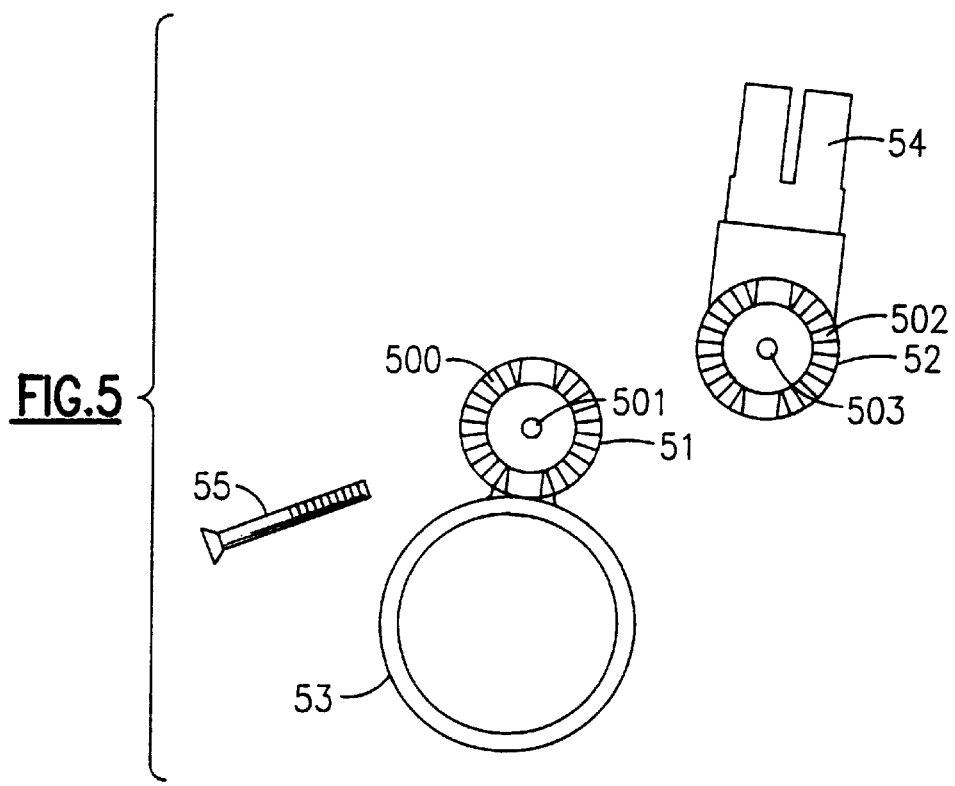
FIG. 5 is a schematic end-on view of a coupling member in accordance with a further embodiment of the invention.

A further embodiment of an engagement device in accordance with the present invention has the form shown schematically in FIG. 5. The engagement device has a distendable hollow sleeve 54 connected to a body portion 52 which includes engaging teeth 502 and a hollow threaded portion 503. Corresponding body portion 51 is mountable and engageable with body portion 52 by means of teeth 500 and threaded hole 501. A sleeve 53, which forms a tightening member for an engagement device of the type having a deformable flared sleeve (not shown) is formed integrally with body portion 51.

Figure 6:
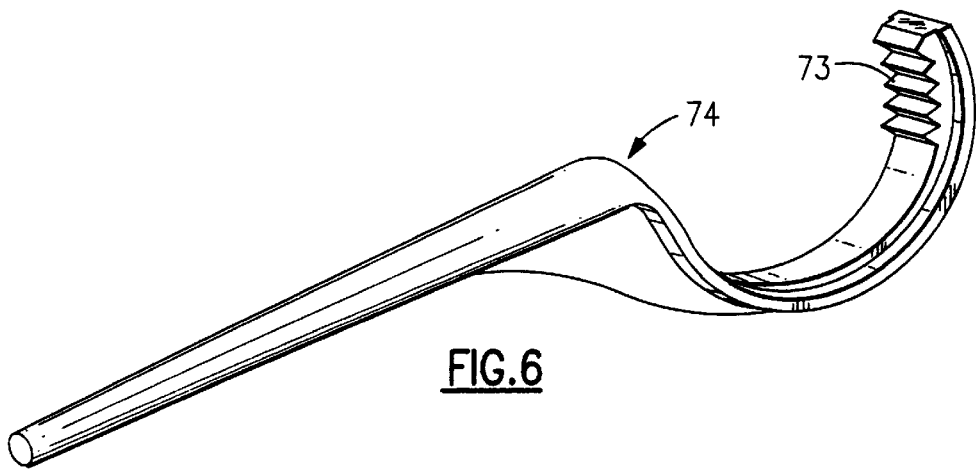
FIG. 6 is a perspective view from one side of a "C" spanner for use in tightening a biasing means, such as a tightening nut, for an engagement device in accordance with an embodiment of the present invention.

With regard to tightening nut 5 of the embodiment of FIGS. 1 to 4, serrations may be provided in the outer periphery of the tightening nut and a C spanner as shown in FIG. 6 may be provided to tighten the nut 5. The C spanner has projections 73 to fit into corresponding serrations on the nut 5. Further, the C spanner has a cut out portion 74 in handle 80 to enable the C portion of the spanner to be flexible enough to fit onto the nut 5.

Figure 7:
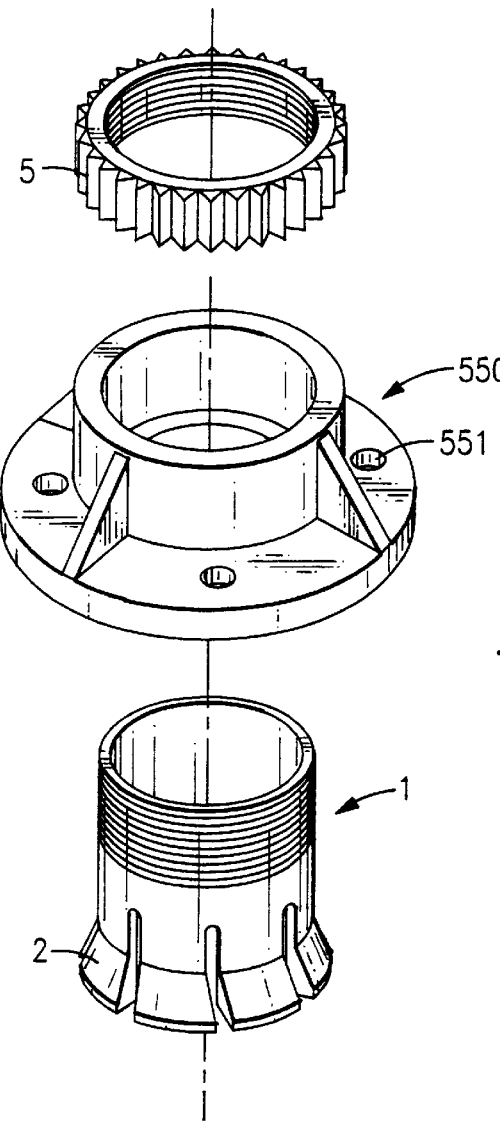
FIG. 7 shows an engagement device in accordance with a further embodiment of the present invention.

A further embodiment of an engagement device in accordance with the present invention is shown in FIG. 7. The engagement device comprises a sleeve 4 and tightening nut 5 which have the same operation as the corresponding components of the embodiments of FIGS. 1 to 4. Sleeve 1 can receive and grip a beam passing therethrough. A tightening member 550 is in the form of a stand or base. Holes 551 can be used to mount a beam on appropriate substrate, such as a platform, for example. Tightening member 550 has a flared surface (not shown) to operate flared surface 2 of sleeve 1.

Figure 8:
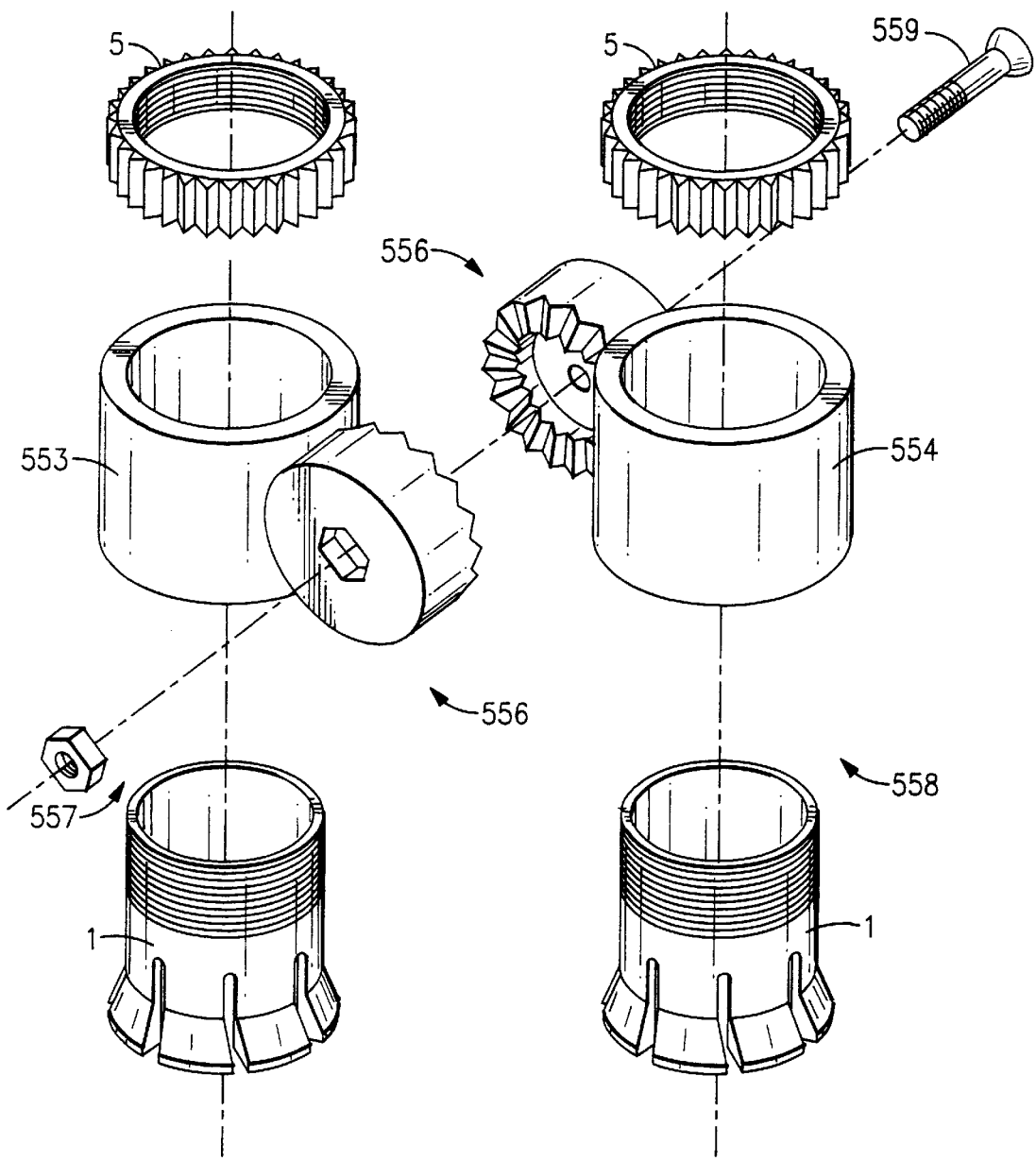
FIG. 8 is an exploded perspective view from one side of a coupling member in accordance with a further embodiment of the present invention.

FIG. 8 shows a further embodiment of a coupling member in accordance with the present invention. Components 1 and 5 are the same as components 1 and 5 of the embodiment shown in FIGS. 1 to 4. The tightening member 553 in each case, however, is provided with a projecting body portion 554. Teeth 555 are provided on the projecting body portion for engagement with teeth 555 on a corresponding body portion. Relative attitudes of the engagement devices, generally designated by reference numerals 556 and 557, can be adjusted by way of body portions 554. Screw 559 is provided to fix the body portions 555 together.

Figure 9:
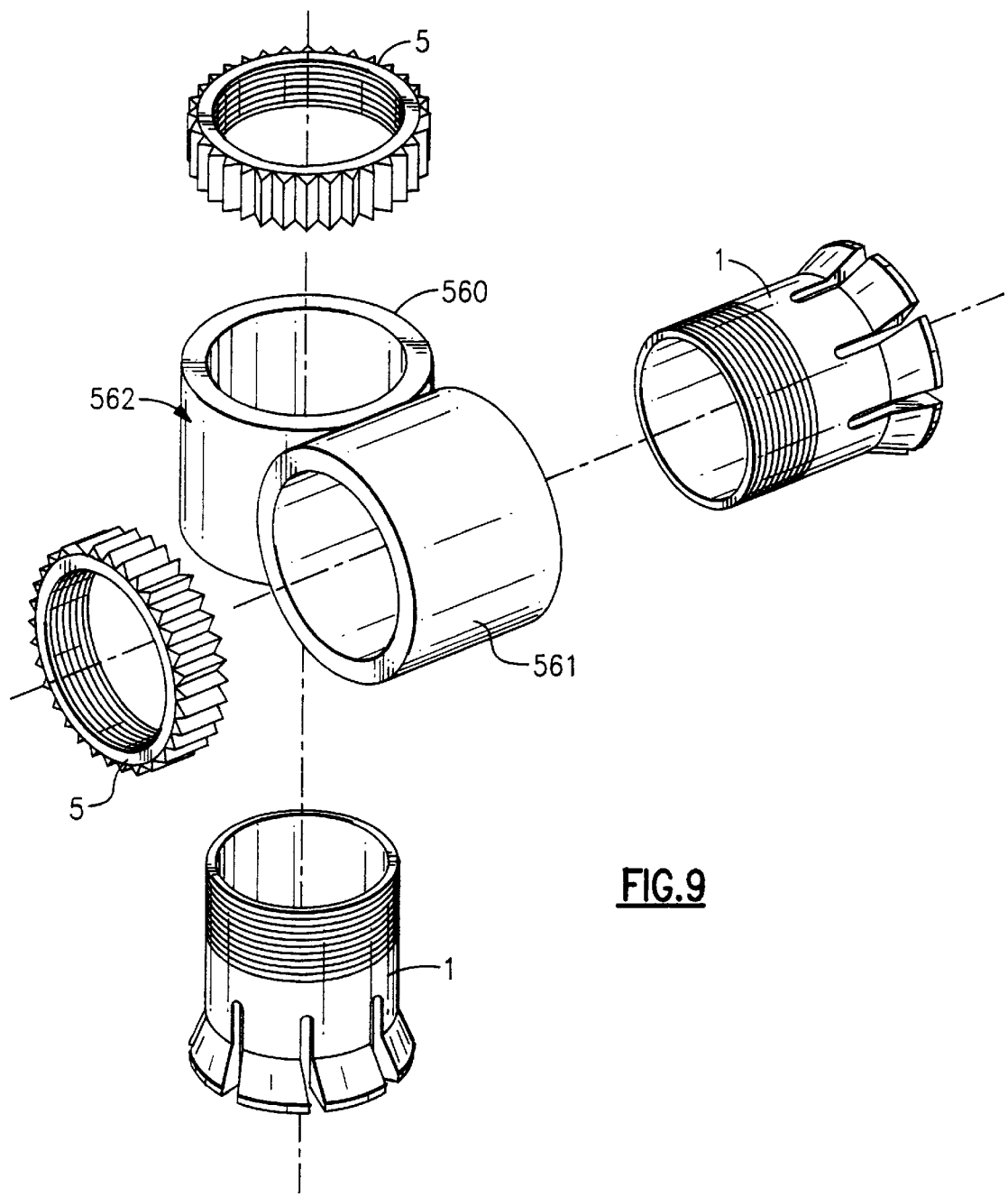
FIG. 9 is an exploded perspective view from one side of a coupling member in accordance with a further embodiment of the present invention.

FIG. 9 shows a further coupling member in accordance with an embodiment of the present invention. The coupling member comprises two engagement devices, generally designated by reference numerals 560 and 561. These engagement devices 560, 561 have sleeve components 1 and tightening nut components 5 which are the same as the corresponding components in the embodiments of FIGS. 1 to 4. The tightening members, however, are comprised of a single integral body 562. The integral body comprises two tightening members joined together with their axes perpendicular. This coupling member enables beams to be coupled so that they run in directions perpendicular to each other.

Figure 10:
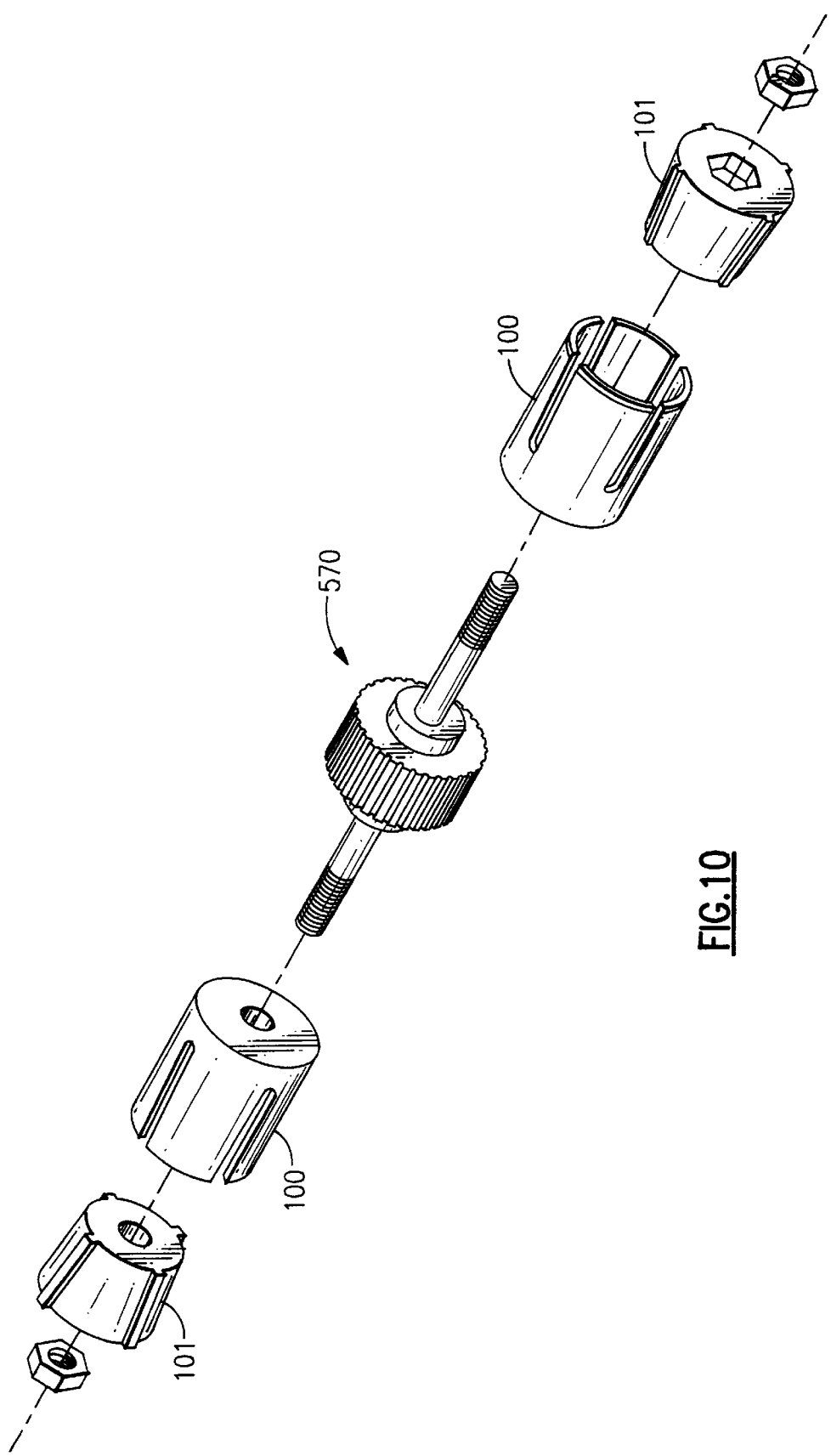
FIG. 10 is an exploded perspective view from one side of a coupling member in accordance with a further embodiment of the present invention.

FIG. 10 shows yet a further embodiment of a coupling member in accordance with the present invention. Two engagement devices of the distending hollow sleeve type are connected in line by a two-way screw arrangement 570. This enables in line connection of tubes.

Figure 11:
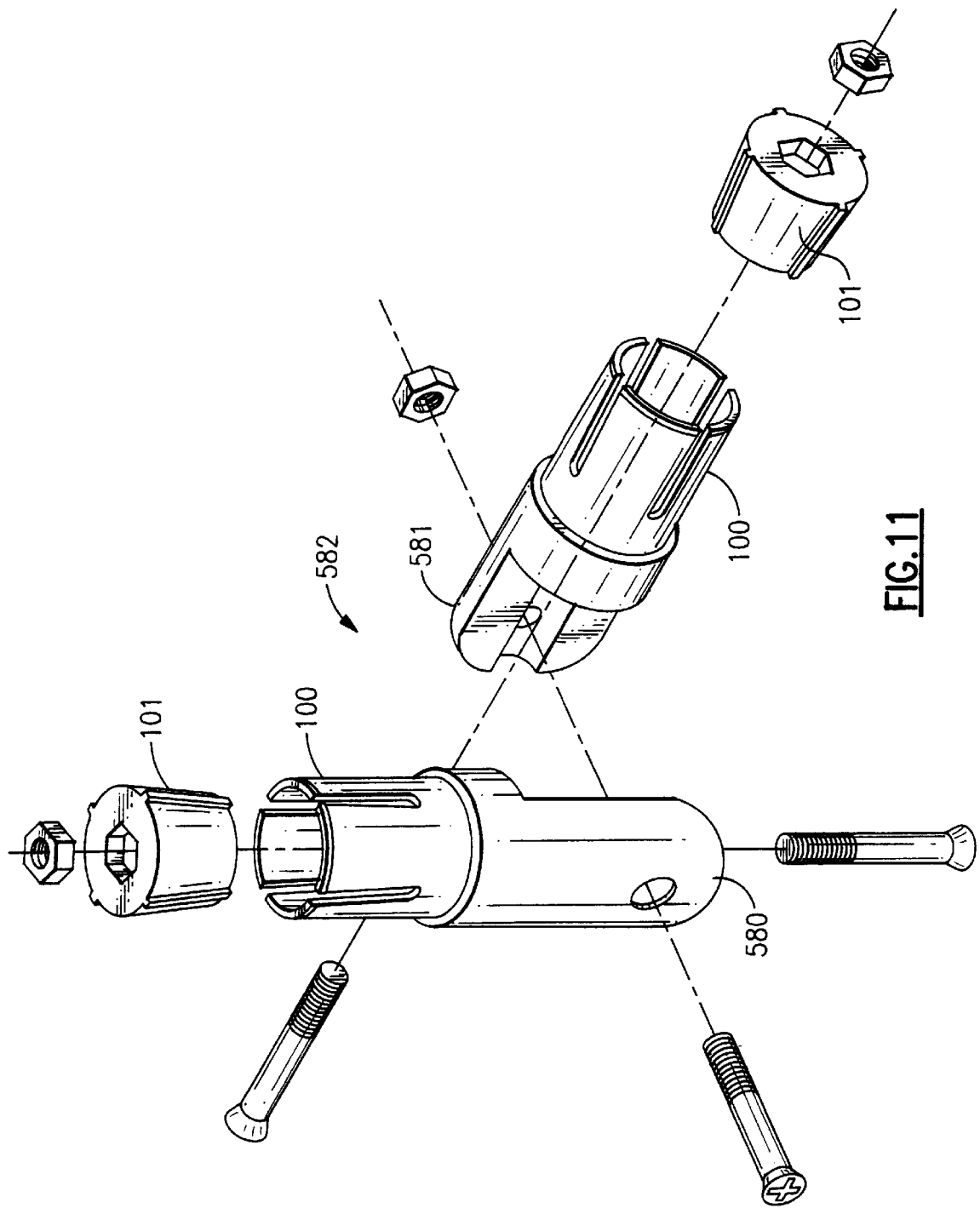
FIG. 11 is an exploded perspective view from one side of a coupling member in accordance with a further embodiment of the present invention.

FIG. 11 shows a further embodiment of the coupling member, comprising two engagement devices of the distending hollow sleeve type connected together by body portions 580 and 581 which are rotatable with respect to each other to vary the angle between the sleeve portions and are fixed together by means of screw 582.

Figure 12:
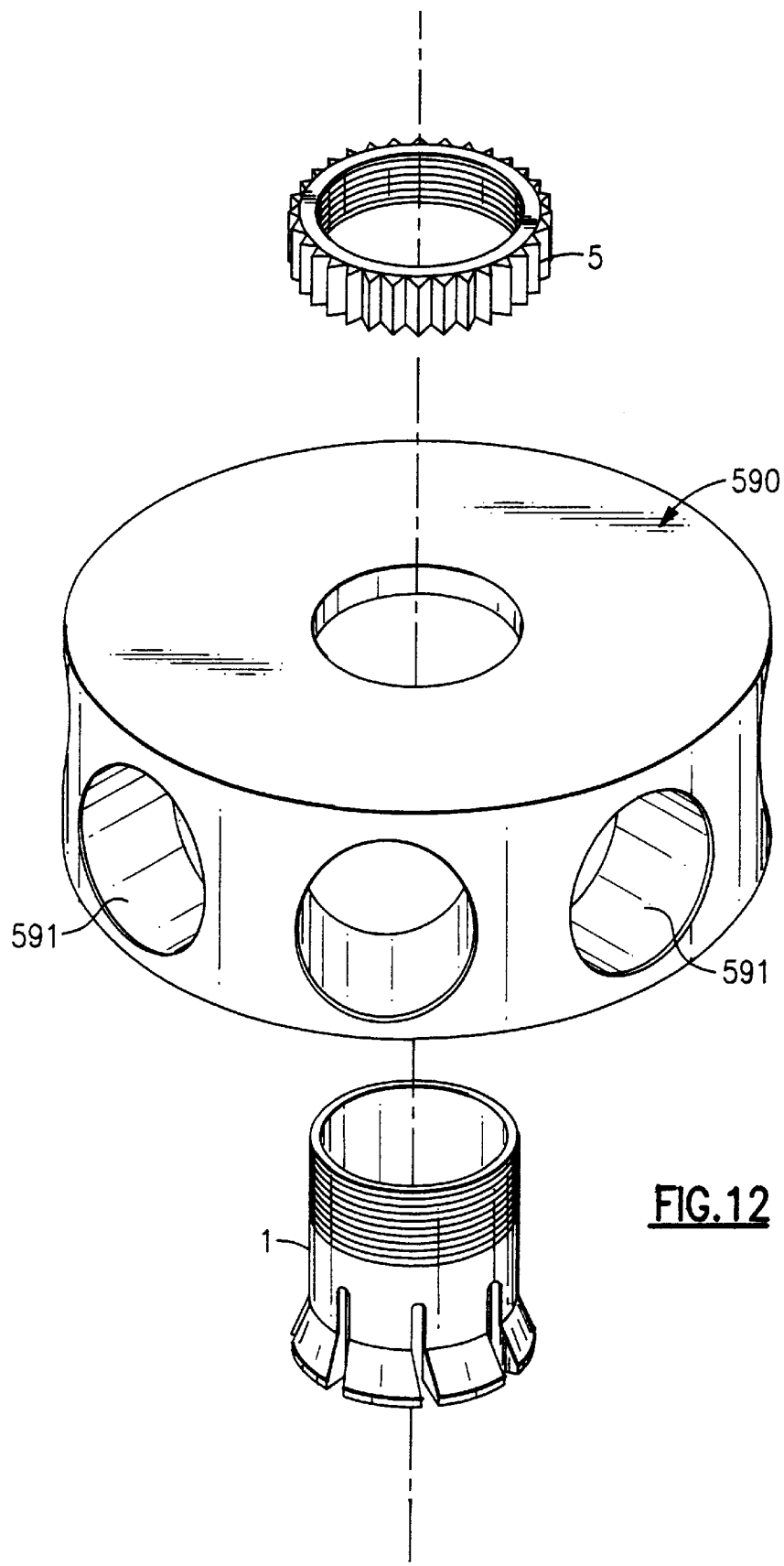
FIG. 12 is an exploded perspective view from one side of a coupling member in accordance with yet a further embodiment of the present invention.
Figure 13B:
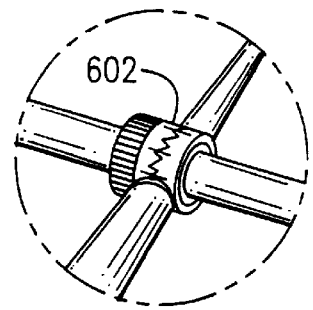
FIGS. 13A, 13B and 13C and 14 are perspective views of structural frame works which may be constructed utilising engagement devices and coupling members in accordance with embodiments of the present invention.
Figure 13A:
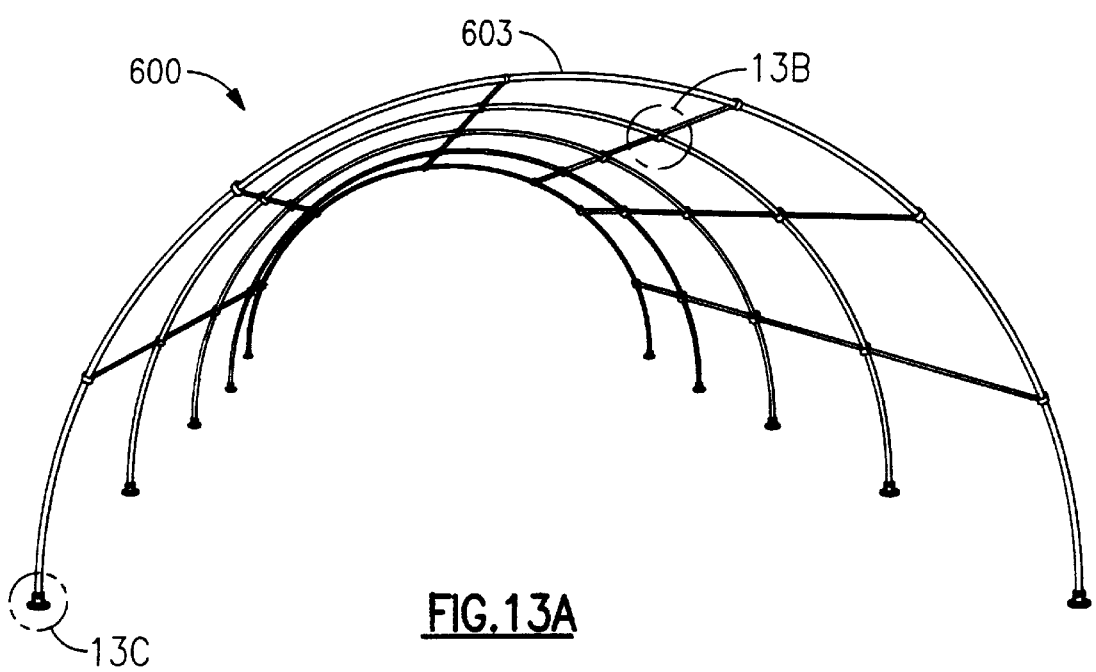
Figure 13C:
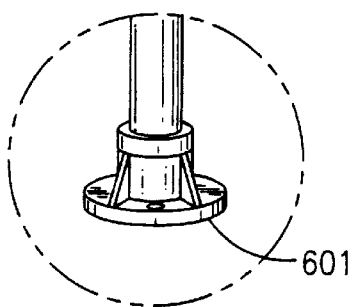
Figure 14:
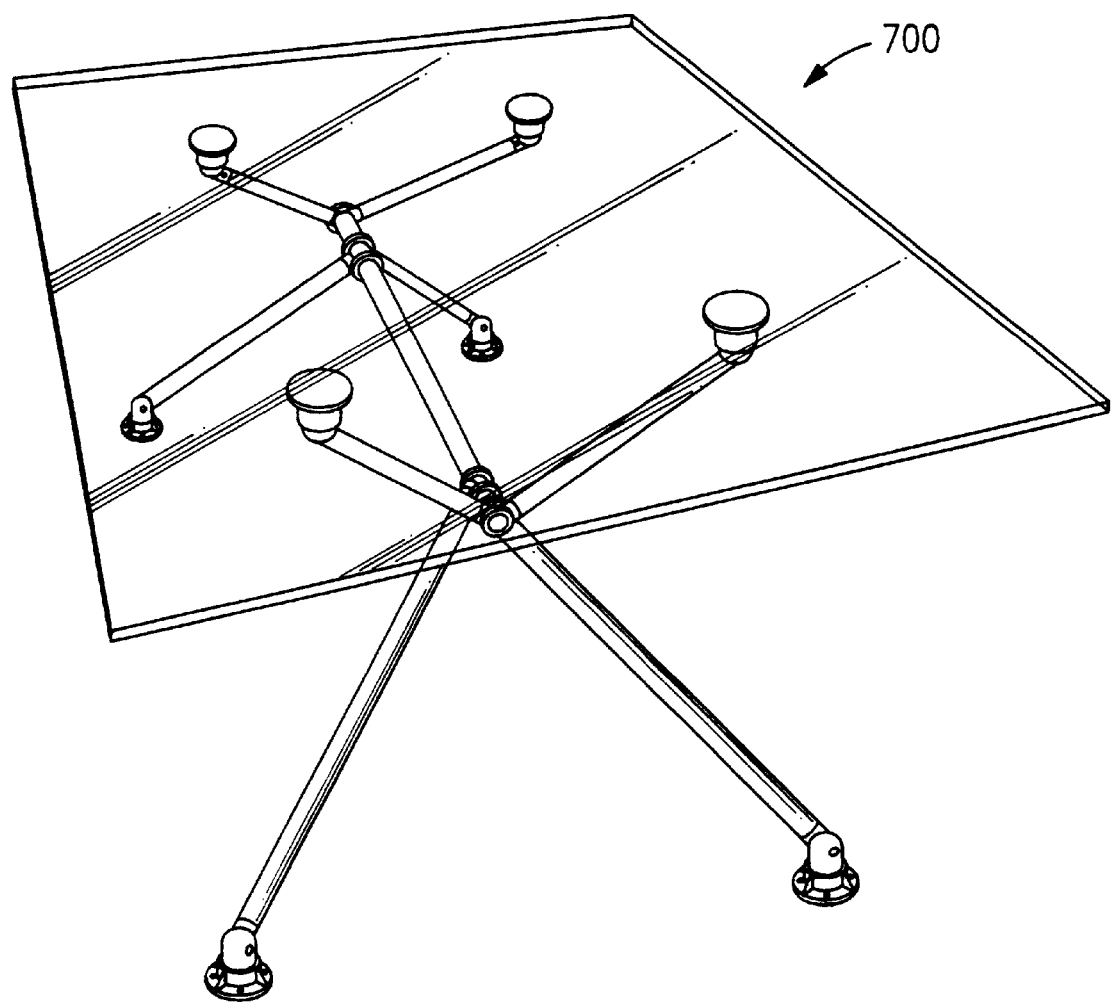

FIG. 12 shows yet a further embodiment of the coupling member in accordance with the present invention. Tightening member 590 comprises a member having a number of orifices 591 which can receive a number of tubes and sleeves (not shown) in order to connect a plurality of tubes to a single tube running through the centre of the coupling member.

FIG. 10 illustrates a "space frame" 600 comprising engagement device 601 and coupling member 602 in accordance with embodiments of the present invention, connecting tubes 603. The engagement device 601 is the engagement device illustrated in FIG. 7 and the coupling member 602 is the coupling member illustrated in FIGS. 1 to 4.

FIG. 11 is a further illustration of a type of frame which can be formed using engagement devices and coupling members in accordance with the present invention. It shows a table 700 formed by tubes, engagement devices and coupling members.

What is claimed is:

1. A coupling member for coupling a plurality of beams together, comprising a first engagement device including a sleeve having a passage therethrough for receiving a first beam, the sleeve having a portion which is deformable to grip the first beam, a tightening member having a passage therethrough for receiving the sleeve and being axially movable with respect to the sleeve and being arranged to co-operate with the deformable portion to cause the deformable portion to deform to grip the first beam, and a biasing means for maintaining the tightening member in co-operation with the deformable portion, the coupling member further including a second engagement device mounted to the first engagement device, the second engagement device being arranged to engage and hold a further beam in a predetermined orientation with respect to the first beam.

2. A coupling member in accordance with claim 1, wherein the second engagement device is mounted to the tightening member.

3. A coupling member in accordance with claim 2, wherein the second engagement device includes a hollow sleeve portion arranged to expand outwardly to grip internal walls of the further beam, and a wedge portion movable within the hollow sleeve portion to cause the hollow sleeve portion to deform outwardly to grip the beam.

4. A coupling member in accordance with claim 3, further including a third engagement device including a further hollow sleeve portion arranged to expand outwardly to grip internal walls of a third beam, and a wedge movable within the further hollow sleeve portion to cause the further hollow sleeve portion to deform outwardly to grip the third beam, the third engagement device being mounted to a further sleeve which is mountable on the sleeve of the first engagement member.

5. A coupling member in accordance with claim 4, the further sleeve being axially movable on the sleeve with the tightening member and including engagement means for engaging with the tightening member, the engagement means enabling adjustment between relative angular positions of the second and third engagement devices whereby to vary a projecting angle between them.

6. A coupling member in accordance with claim 5, wherein the engagement means comprises opposing teeth on the tightening member and further sleeve, respectively.

7. A coupling member in accordance with claim 1, wherein the second engagement device includes a hollow sleeve portion arranged to expand outwardly to grip internal walls of the further beam and a wedge portion movable within the hollow sleeve portion to cause the hollow sleeve portion to deform outwardly to grip the further beam, and connector means being mounted to the second engagement device and corresponding connector means being mounted to the first engagement device, the respective connector means allowing for angular variation of a projecting direction of the second engagement device with the respect to the first engagement device.

8. A coupling member in accordance with claim 1, the second engagement device comprising a second sleeve having a passage therethrough for receiving the further beam, the second sleeve having a portion which is deformable to grip the further beam, a second tightening member having a passage therethrough for receiving the second sleeve and being axially movable with respect to the second sleeve and being arranged to cooperate with the deformable portion to cause the deformable portion to deform to grip the further beam, and a second biasing means for maintaining the second tightening member in cooperation with the deformable portion.

9. A coupling member in accordance with claim 8, the first engagement device and second engagement device being connected by connector means which allow for angular variation of a projecting direction of the second engagement device with respect to the first engagement device.

10. A coupling member in accordance with claim 8, the second tightening member of the second engagement device being integral with the tightening member of the first engagement device, whereby the first and second engagement devices are, in use, in fixed orientation with respect to each other.

11. A coupling member in accordance with claim 1, the deformable portion of the first engagement device comprising an external flared portion of the sleeve, the tightening member having a cooperating flared surface movable over the flared portion of the sleeve to cause deformation of the deformable portion.

12. A coupling member in accordance with claim 11, wherein the deformable portion includes a plurality of slits therein running parallel to the axis of the sleeve, to facilitate deformation.

13. An engagement device in accordance with claim 12, the biasing means comprising a threaded portion of the sleeve and a retainer in the form of a threaded nut arranged to be screwed onto the threaded portion so as to axially move the tightening member over the flared portion of the sleeve.

14. A coupling member in accordance with claim 13, wherein the sleeve is a tubular sleeve, and the tightening member comprises a further tubular sleeve movable axially over the outside of the sleeve.

15. A framework, comprising a plurality of beams mounted with respect to each other by a coupling member having a first engagement device including a sleeve having a passage therethrough for receiving a first of the plurality of beams, the sleeve having a portion which is deformable to grip the first beam, a tightening member having a passage therethrough for receiving the sleeve and being axially movable with respect to the sleeve and being arranged to co-operate with the deformable portion to cause the deformable portion to deform to grip the first beam, and a biasing means for maintaining the tightening member in co-operation with the deformable portion, the coupling member further including a second engagement device mounted to the first engagement device, the second engagement device being arranged to engage and hold a further beam of the plurality of beams in a predetermined orientation with respect to the first beam.

* * * * *